(12) United States Patent
Fukuda

(10) Patent No.: US 7,588,117 B2
(45) Date of Patent: Sep. 15, 2009

(54) STRUCTURE AND METHOD FOR MOUNTING DRIVE MOTOR

(75) Inventor: Takuya Fukuda, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 618 days.

(21) Appl. No.: 10/566,996

(22) PCT Filed: Apr. 19, 2004

(86) PCT No.: PCT/JP2004/005540

§ 371 (c)(1),
(2), (4) Date: Feb. 2, 2006

(87) PCT Pub. No.: WO2005/030516

PCT Pub. Date: Apr. 7, 2005

(65) Prior Publication Data

US 2007/0051549 A1    Mar. 8, 2007

(30) Foreign Application Priority Data

Sep. 29, 2003    (JP) .............................. 2003-338249

(51) Int. Cl.
*B60K 8/00*  (2006.01)
(52) U.S. Cl. ..................... 180/291; 180/65.31; 180/299
(58) Field of Classification Search ............... 180/65.1, 180/65.2, 65.3, 291, 292, 297, 299, 165
See application file for complete search history.

(56) References Cited

U.S. PATENT DOCUMENTS

| | | | |
|---|---|---|---|
| 3,752,247 A | 8/1973 | Schwenk | |
| 4,487,287 A * | 12/1984 | Watanabe | 180/297 |
| 5,133,427 A * | 7/1992 | Arvidsson et al. | 180/297 |
| 5,372,216 A * | 12/1994 | Tsuji et al. | 180/274 |
| 5,476,151 A | 12/1995 | Tsuchida et al. | |
| 5,740,876 A | 4/1998 | Shimose et al. | |
| 6,085,858 A | 7/2000 | Wakana et al. | |
| 6,494,286 B2 | 12/2002 | Shimizu et al. | |
| 6,607,172 B1 * | 8/2003 | Green et al. | 248/309.1 |
| 6,722,696 B2 | 4/2004 | Sonomura et al. | |
| 6,761,242 B2 | 7/2004 | Yoshida et al. | |
| 6,968,915 B2 * | 11/2005 | Takagi et al. | 180/65.3 |
| 7,213,671 B2 * | 5/2007 | Hirayu | 180/291 |
| 2002/0096384 A1 | 7/2002 | Yoshida et al. | |
| 2003/0011184 A1 | 1/2003 | Sonomura et al. | |

FOREIGN PATENT DOCUMENTS

| | | |
|---|---|---|
| DE | 2 241 651 | 3/1974 |
| JP | 59-196748 U | 12/1984 |
| JP | 60-85646 U | 6/1985 |
| JP | 2-013705 Y2 | 4/1990 |

(Continued)

*Primary Examiner*—Christopher P Ellis
*Assistant Examiner*—John D Walters
(74) *Attorney, Agent, or Firm*—Foley & Lardner LLP

(57) ABSTRACT

A drive motor mounting structure of an electric vehicle, including: a drive motor unit (12) having its front part attached to a vehicle body member (17) in a front part of a vehicle (10) by use of a front motor mount (27); and a rigid robust member (31) disposed in front of and obliquely above the drive motor unit (12), and above and in front of the front motor mount (27).

12 Claims, 10 Drawing Sheets

FOREIGN PATENT DOCUMENTS

| | | |
|---|---|---|
| JP | 6-270694 A | 9/1994 |
| JP | 7-081429 A | 3/1995 |
| JP | 9-272459 A | 10/1997 |
| JP | 10-053028 A | 2/1998 |
| JP | 10-141431 A | 5/1998 |
| JP | 11-011159 A | 1/1999 |
| JP | 11-245668 A | 9/1999 |
| JP | 2000-255282 A | 9/2000 |
| JP | 2000-313239 A | 11/2000 |
| JP | 2002-127762 A | 5/2002 |
| JP | 2002-211249 A | 7/2002 |
| JP | 2002-266917 A | 9/2002 |
| JP | 2002-274194 A | 9/2002 |
| JP | 2002-349632 A | 12/2002 |
| JP | 2002-362167 A | 12/2002 |
| JP | 2003-19909 A | 1/2003 |

* cited by examiner

STRUCTURE AND METHOD FOR MOUNTING DRIVE MOTOR

TECHNICAL FIELD

The present invention relates to a mounting structure for a drive motor in a motor vehicle such as an electric vehicle and a fuel cell powered vehicle.

BACKGROUND ART

Japanese Patent Application Laid-Open Publication No. 11 (1999)-245668 discloses a structure to alleviate transmission of a collision load to a passenger space of a vehicle when the vehicle encounters a frontal collision, in which an engine block is connected to a vehicle body by a link member, and the engine block is dropped with the link member swung, when the collision load is inputted.

SUMMARY OF THE INVENTION

However, in the structure described above, adoption of the link member triggers an increase in weight of the vehicle and a rise in manufacturing costs.

It is an object of the present invention to provide a drive motor mounting structure for alleviating a collision load transmission to a passenger space of a vehicle without increasing a vehicle weight and manufacturing costs.

In order to achieve the foregoing object, in an aspect of the present invention, a drive motor unit including a drive motor and drive gears is rotatably mounted at a front side thereof onto a vehicle body member, which is provided in a front part of a vehicle, by use of a front motor mount, and a rigid robust member is provided in front of and obliquely above the drive motor unit as well as above and in front of the front motor mount.

BEST MODE FOR CARRYING OUT THE INVENTION

Figure 1:
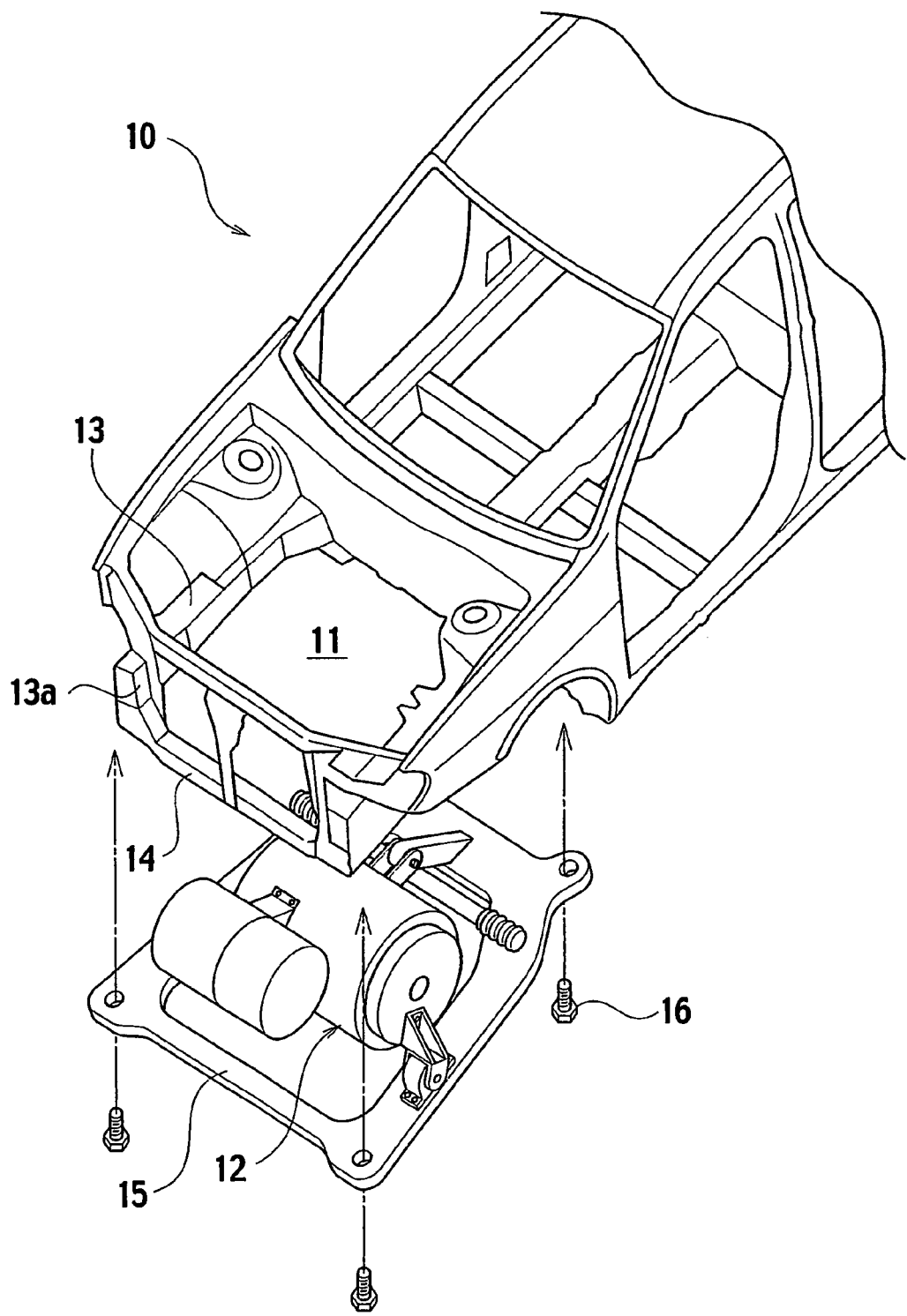
FIG. 1 is a perspective view showing a vehicle body to which a drive motor mounting structure according to a first embodiment of the present invention is applied.
Figure 2:
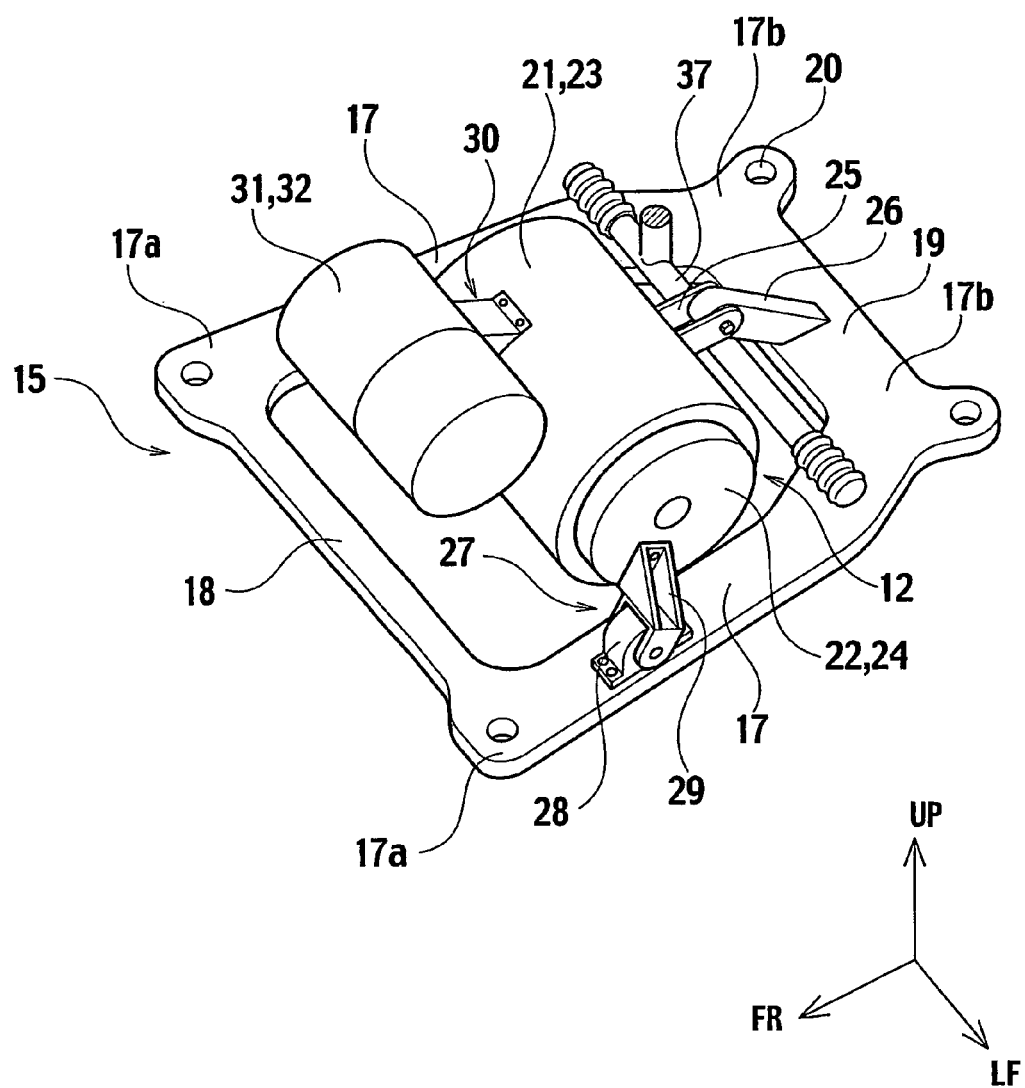
FIG. 2 is a perspective view showing a suspension member including a drive motor and an air compressor according to the first embodiment of the present invention.

With reference to the drawings, embodiments of the present invention will be described in detail below.

First Embodiment

In a front part of a vehicle body 10, a motor room 11 is defined. On both left and right sides of a lower part of the motor room 11, side members 13 are provided along a longitudinal direction of a vehicle. Front end portions 13a of the side members 13 are connected to each other by a front cross member 14 extended in a vehicle width direction. A suspension member 15 is attached with bolts 16 to lower sides of the side members 13 and the front cross member 14. On the suspension member 15, a drive motor unit 12 to be described later is provided.

Figure 3:
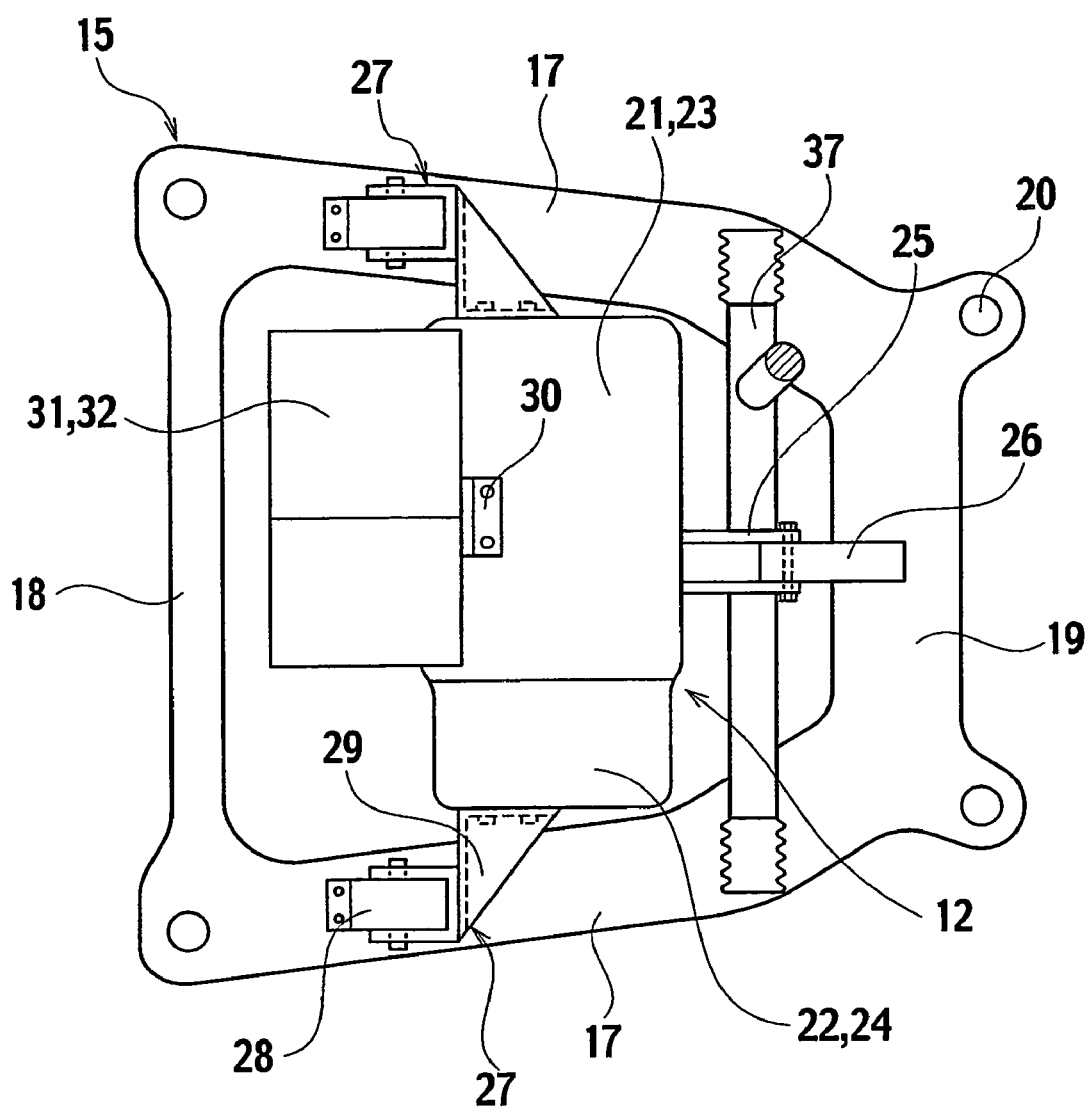
FIG. 3 is a plan view of the drive motor, the air compressor and the suspension member shown in FIG. 2.

As shown in FIG. 3, the suspension member 15 is formed to have a substantially square-frame-shape in plan view, in which side member portions 17 extended along the longitudinal direction of the vehicle on both of left and right sides of the vehicle body 10, the front member portion 18 which connects front ends 17a of the side member portions 17 and a rear member portion 19 which bridges rear ends 17b of the side member portions 17 are integrally connected to each other. In four corners of the suspension member 15, bolt holes 20 are drilled, respectively. As shown in FIG. 1, the bolts 16 are inserted into the bolt holes 20 and screwed into attachment holes (not shown) of the side members 13 and the front cross member 14.

The drive motor unit 12 has a module structure including: a drive motor 21 provided on the right side of the vehicle body 10; and a drive gear 22 which is adjacently provided on a left side (an output shaft side) of the drive motor 21 and has reduction gears. The drive motor 21 and the drive gear 22 are integrally mounted on the suspension member 15 in a state of being housed in casings 23 and 24, respectively. The drive motor 21 is connected to an unillustrated power source, and is connected to the drive gear 22 provided on the output shaft of the drive motor 21 to transmit torque to the drive gear 22.

Figure 4:
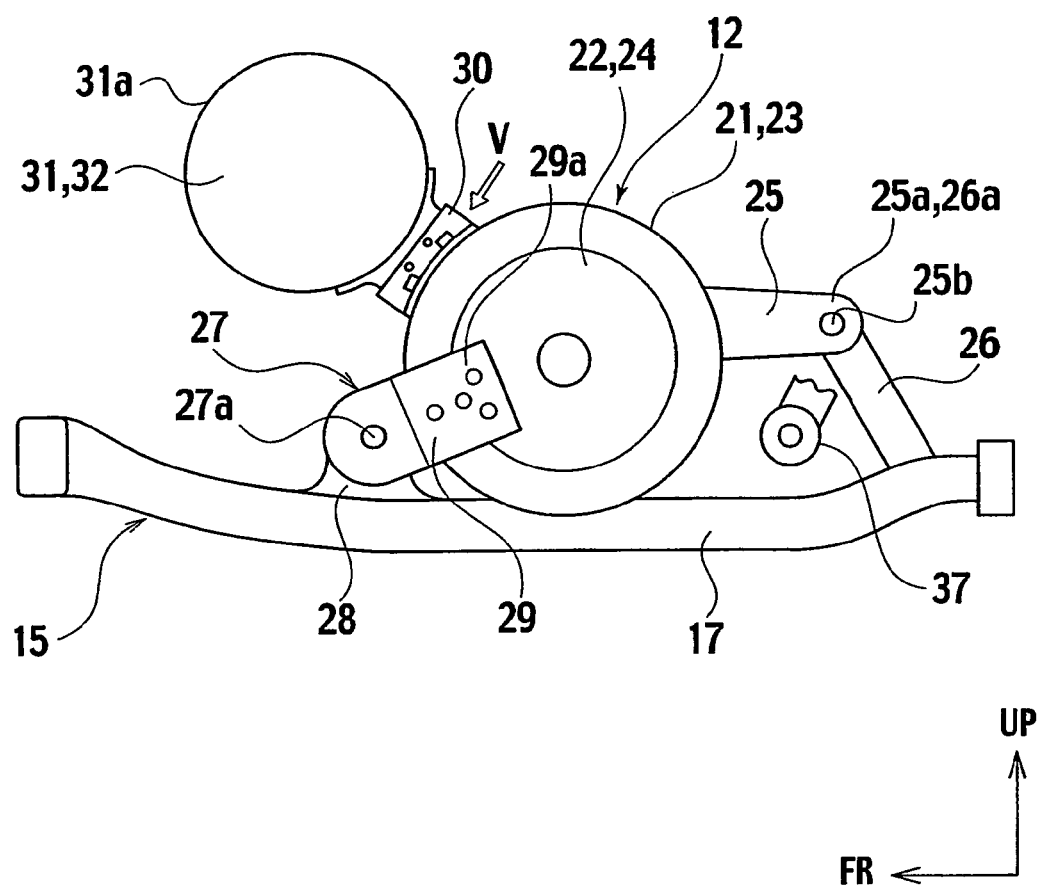
FIG. 4 is a side view of the drive motor, the air compressor and the suspension member shown in FIG. 2.

A rear part of the drive motor unit 12 is attached to the suspension member 15 by use of a rear motor mount 25 and a stay 26. As shown in FIGS. 3 and 4, the stay 26 is formed so as to protrude forward and obliquely upward from an upper surface of a center portion in the vehicle width direction of the rear member portion 19. The rear motor mount 25 is extended substantially horizontally toward the rear side of the vehicle from a rear part of the casing 23 of the drive motor 21. The rear motor mount 25 is formed to have a substantially U shape in plan view, and is rotatably supported in a state where an upper end portion 26a of the stay 26 is fitted into an attachment part 25a on its rear end.

A front part of the drive motor unit 12 is attached to the suspension member 15 by use of front motor mounts 27. Each of the front motor mounts 27 is constituted of a motor mount main body 28 and a mount bracket 29. The motor mount main body 28 is fixed to a front portion of the side member portion 17 of the suspension member 15. The mount bracket 29 is rotatably supported around a shaft 27a on an upper part of the motor mount main body 28. An end portion 29a of the mount bracket 29 is fastened with a bolt onto a boss part (not shown) which is formed on a side of the casing 24 of the drive gear 22. As shown in FIG. 4, a shaft 25b of the attachment part 25a of the rear motor mount 25 is disposed above the front motor mounts 27.

Similar to the mount 27 on the left side described above, the front motor mount 27 on the right side is constituted of: a motor mount main body 28 fixed to the side member portion 17 of the suspension member 15; and a mount bracket 29 which is rotatably supported by the motor mount main body 28 and is fixed to a right side of the casing 23 of the drive motor 21. The left and right front motor mounts 27 are formed so as to have strength higher than that of the rear motor mount 25. Thus, if a collision load is inputted to the drive motor unit 12, the rear motor mount 25 is deformed before the front motor mounts 27.

Figure 5:
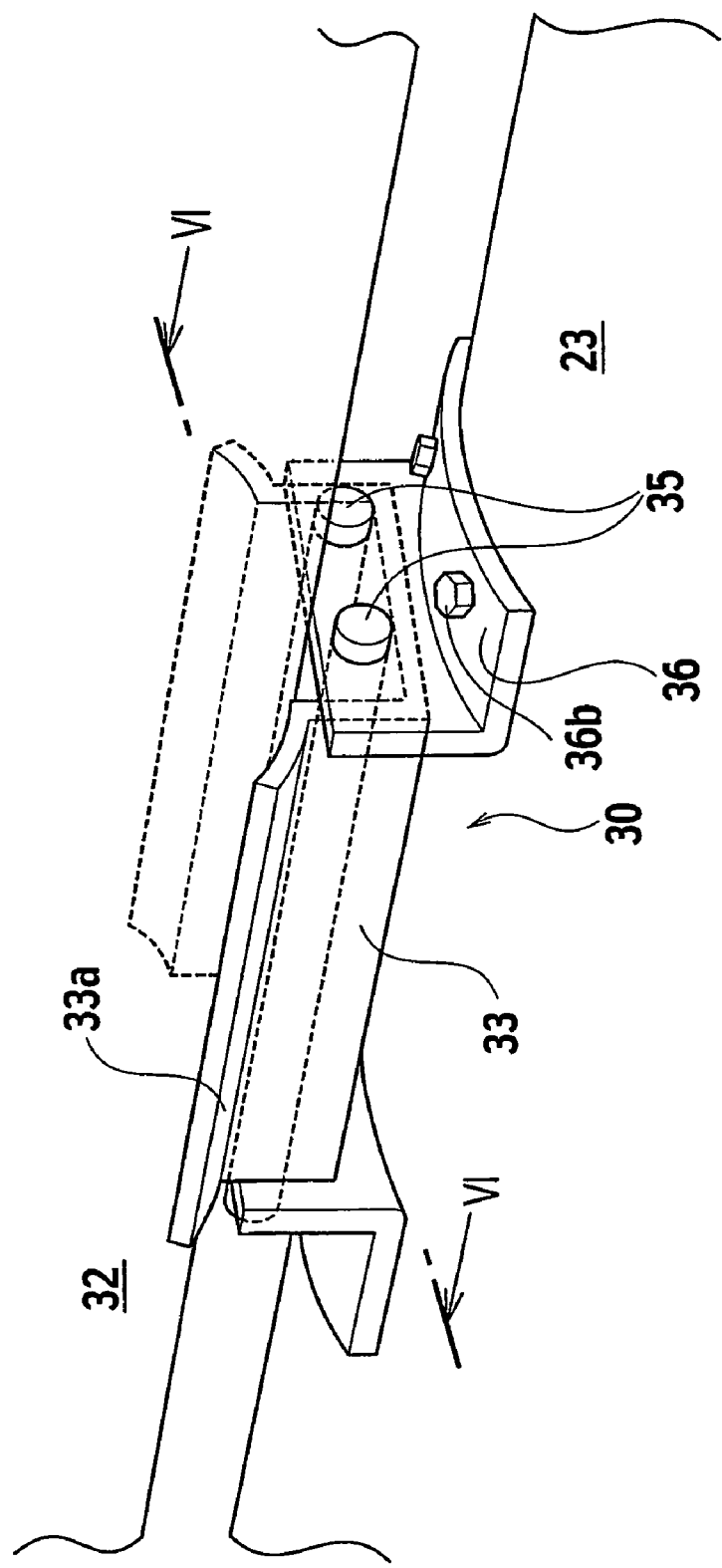
FIG. 5 is a perspective view of a fixation part of the air compressor to the drive motor in FIG. 4, when viewed from a direction indicated by the arrow V in FIG. 4.
Figure 6:
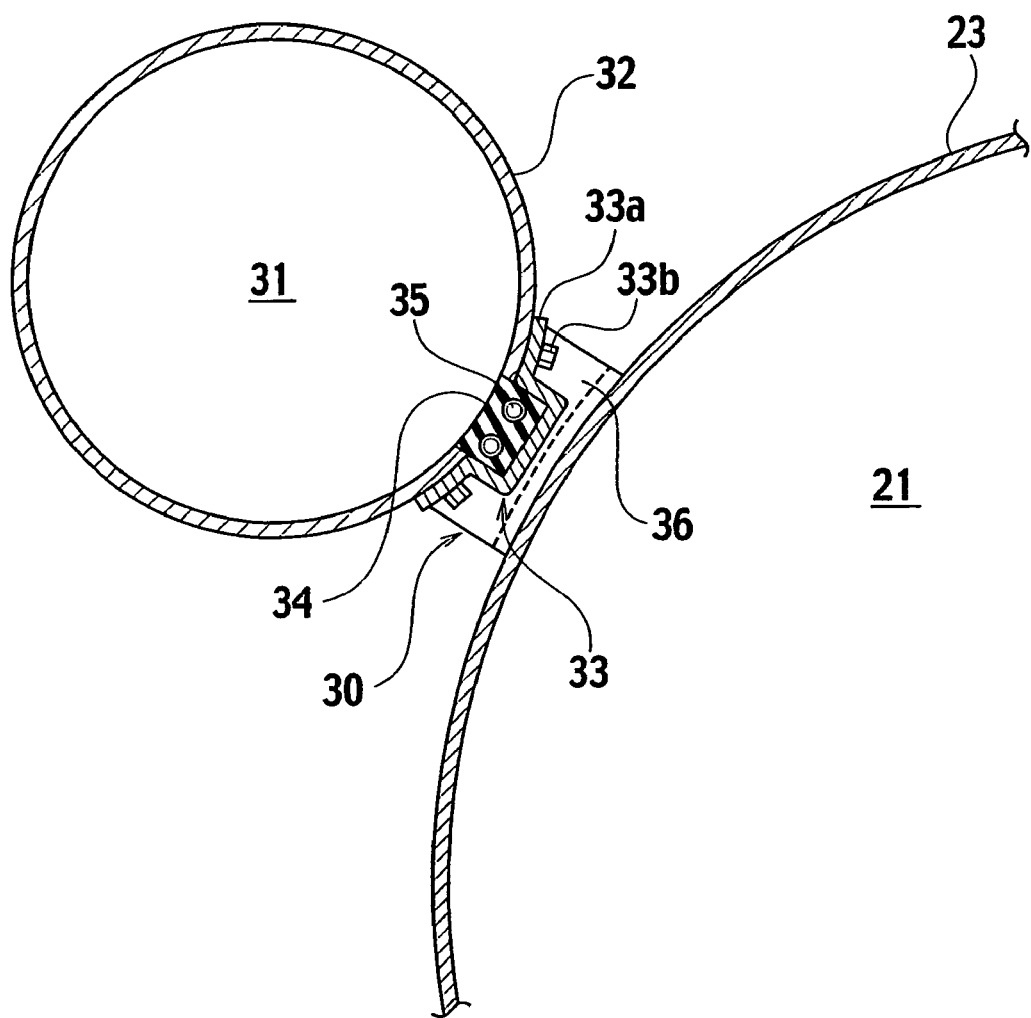
FIG. 6 is a cross-sectional view along the line VI-VI in FIG. 5, showing the fixation part of the air compressor to the drive motor.

In front of and obliquely above the casing 23 of the drive motor 21, an air compressor 31 is supported thereon and is vibration isolated therefrom by use of an antivibration mount 30. As shown in FIG. 6, the air compressor 31 is housed in a casing 32 made of metal, and the antivibration mount 30 is attached to the casing 32. As shown in FIGS. 5 and 6, the antivibration mount 30 is constituted of: an attachment bracket 33 extended in the vehicle width direction, which has a substantially hat-shaped cross section, including a flange part 33a fixed to the casing 32 by use of bolts 33b; an antivibration bush 34 housed in the attachment bracket 33 and made of hard rubber; two rotating shafts 35 extended in the vehicle width direction while penetrating inside of the antivibration bush 34; and supporting brackets 36 each having a substantially L-shaped cross section, which are fixed to the casing 23 of the drive motor 21 by use of bolts 36b, to support both ends of the rotating shafts 35.

A front end portion 31a of the air compressor 31 is disposed in front of and above the front motor mounts 27 as well as in front of and obliquely above the drive motor unit 12. When the vehicle encounters a frontal collision, a collision load is inputted to the air compressor 31 before it is inputted to the front motor mounts 27.

As shown in FIG. 4, between the rear motor mount 25 and the side member portions 17 of the suspension member 15, a steering rack 37 is extended along the vehicle width direction. As described above, since the rear motor mount 25 is provided in an elevated position, the steering rack 37 can be disposed by effectively utilizing a space under the rear motor mount 25.

Figure 7:
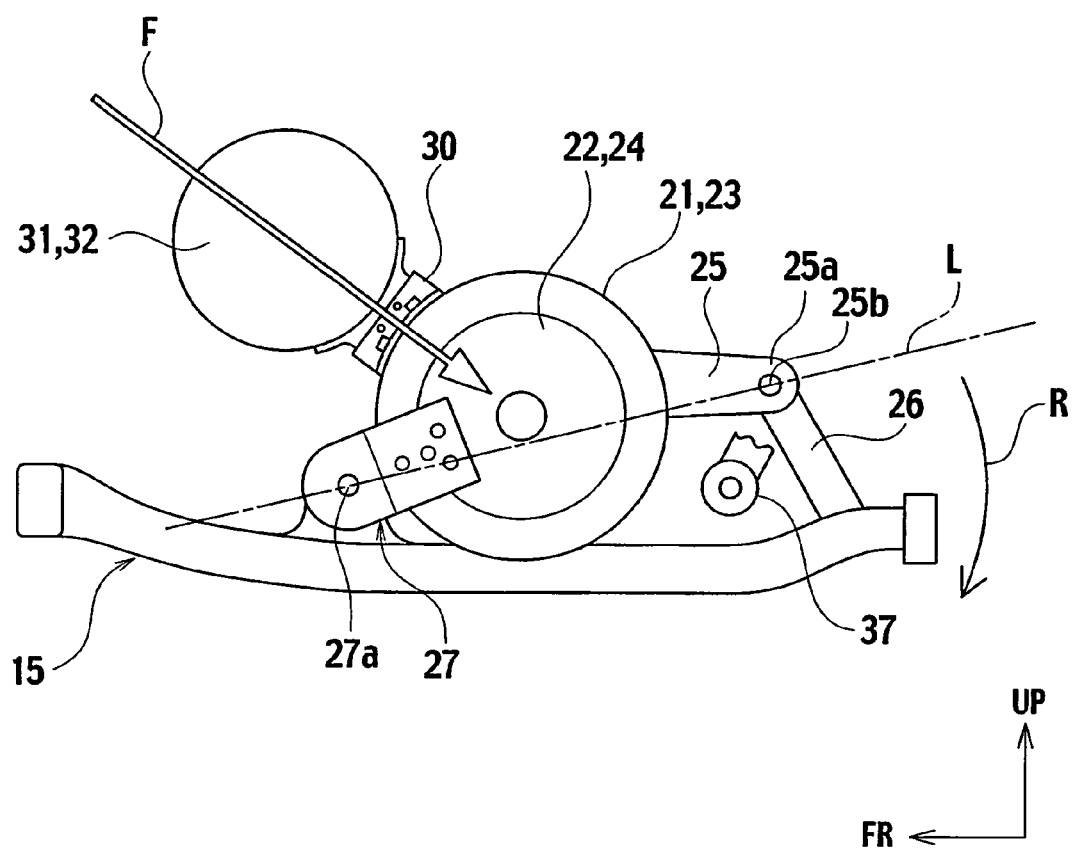
FIG. 7 is a side view showing transmission of a collision load inputted to the air compressor.
Figure 8:
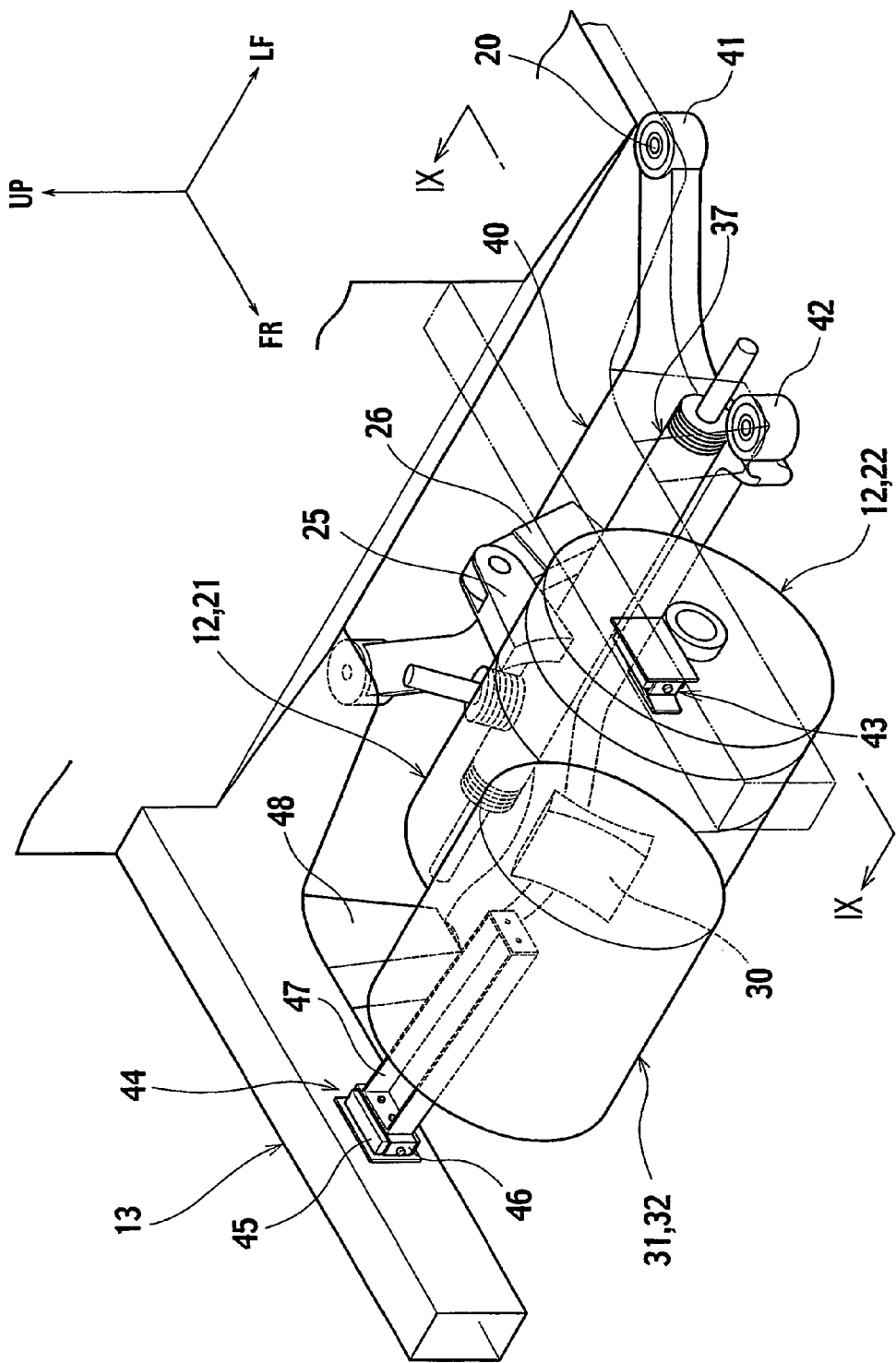
FIG. 8 is a perspective view showing a side member including a drive motor unit and an air compressor according to a second embodiment.

Moreover, by attaching the front motor mounts 27 and the rear motor mount 25 to the suspension member 15, a structure in which the drive motor unit 12 is supported from therebelow is formed. Thus, when the collision load is inputted, the drive motor unit 12 tends to be rotated in an R direction (FIG. 7). In addition, the front motor mounts 27 and the rear motor mount 25 are structural members different from the side members (vehicle main body) 13. Thus, attachment/detachment workability is also improved.

Description will be given of transmission of a collision load inputted to a vehicle body including the attachment structure described above.

When the vehicle encounters a frontal collision, as shown in FIG. 7, a collision load F is inputted to the air compressor 31. The load F is transmitted through the antivibration mount 30 and the drive motor 21 of the drive motor unit 12 to the front motor mounts 27 and the rear motor mount 25. As described above, since the rear motor mount 25 is formed so as to have strength lower than that of the front motor mounts 27, the rear motor mount 25 starts to be deformed (buckled) before the front motor mounts 27. Thus, the drive motor unit 12 drops while rotating in the R direction around the shafts 27a of the front motor mounts 27. Therefore, backward movement of the drive motor unit 12 is effectively prevented, and backward movement of a dash panel is suppressed.

As shown in FIG. 7, the shaft 25b of the attachment part 25a of the rear motor mount 25 is disposed above the shafts 27a of the front motor mounts 27. Thus, an angle formed by a straight line L (a dashed line in FIG. 7) passing through the shaft 25b of the attachment part 25a and the fixed shafts 27a of the front motor mounts 27, and the direction of the load F becomes closer to a right angle. The closer the angle gets to the right angle, the more efficiently the collision load F is received by the rear motor mount 25 and the front motor mounts 27. Accordingly, the drive motor unit 12 is properly displaced downward, and collision energy of the vehicle is effectively absorbed.

According to the attachment structure for the drive motor having the configuration described above, the following operational effects are achieved.

First, since the air compressor 31 having a higher strength as a rigid robust member is disposed above and in front of the drive motor unit 12, a load pushing the drive motor unit 12 downward when the vehicle encounters a frontal collision is more surely transmitted to the drive motor unit 12.

Moreover, the air compressor 31 is mounted by use of the antivibration mount 30 having high antivibration properties. This antivibration mount 30 functions as a dynamic damper which effectively utilizes a mass of the air compressor 31. Thus, sound vibration performance of the drive motor 21 is improved.

In addition, the rear part of the drive motor unit 12 is attached to the suspension member 15 by use of the rear motor mount 25 disposed above the front motor mounts 27. Specifically, the angle of the direction of the collision load F transmitted to the drive motor unit 12 with respect to the straight line connecting the front motor mount 27 to the rear motor mount 25 becomes closer to the right angle. Therefore, the drive motor unit 12 absorbs the collision energy while being properly displaced downward by the collision load F.

Furthermore, the strength of the front motor mounts 27 are set higher than that of the rear motor mount 25. Thus, when the collision load F is inputted, the rear motor mount 25 starts to be buckled and deformed before the front motor mounts 27, and the drive motor unit 12 is rotated around the shafts 27a of the front motor mounts 27 and moved downward. Consequently, backward movement of the drive motor unit 12 is prevented and an amount of backward movement of the dash panel can be suppressed.

Still furthermore, the rear motor mount 25 is attached to the stay 26 extended upward from the rear part of the suspension member 15. Thus, the strength of the rear motor mount 25 becomes lower than that of the front motor mounts 27. Consequently, the drive motor unit 12 can be effectively moved downward by the collision load F.

Moreover, the rear motor mount 25 is supported by the stay 26, and the rear motor mount 25 supports the drive motor unit 12 on one spot and the front motor mounts 27 support the unit 12 on two left and right spots. Thus, the strength of the rear motor mount 25 becomes lower than that of the front motor mounts 27. Consequently, the drive motor unit 12 can be effectively dropped downward.

Second Embodiment

The collision load transmitted to the passenger space can also be reduced according to a second embodiment as described below, besides the first embodiment described above. Note that the same constituent components as those of the first embodiment described above are denoted by the same reference numerals, and description thereof will be omitted.

A suspension member 40 is formed to have a substantially H shape in plan view and has rear end portions 41 extended backward while being branched off to both of left and right sides in the vehicle width direction in a rear part of the suspension member 40, and front end portions 42 extended forward while being branched off to the left and right in a front part thereof. The rear end portions 41 and the front end portions 42 serve as attachment parts of the suspension member 40 to side members 13, respectively, and have bolt holes 20 drilled therein, into which bolts are inserted. The front end portions 42 are fastened with bolts onto column members 48 extended downward from lower surfaces of the side members 13.

Moreover, a stay 26 is provided so as to protrude forward and obliquely upward from a rear side of a center portion in the vehicle width direction of the suspension member 40. A rear motor mount 25 which is extended backward from a rear side of a drive motor unit 12 is rotatably supported on a tip portion of the stay 26. Thus, the rear side of the drive motor unit 12 is attached to the suspension member 40 by use of the rear motor mount 25 and the stay 26.

Both of left and right sides of a front part of the drive motor unit 12 are attached to the side members 13 as lateral members by use of front motor mounts 43 and 44.

Figure 9:
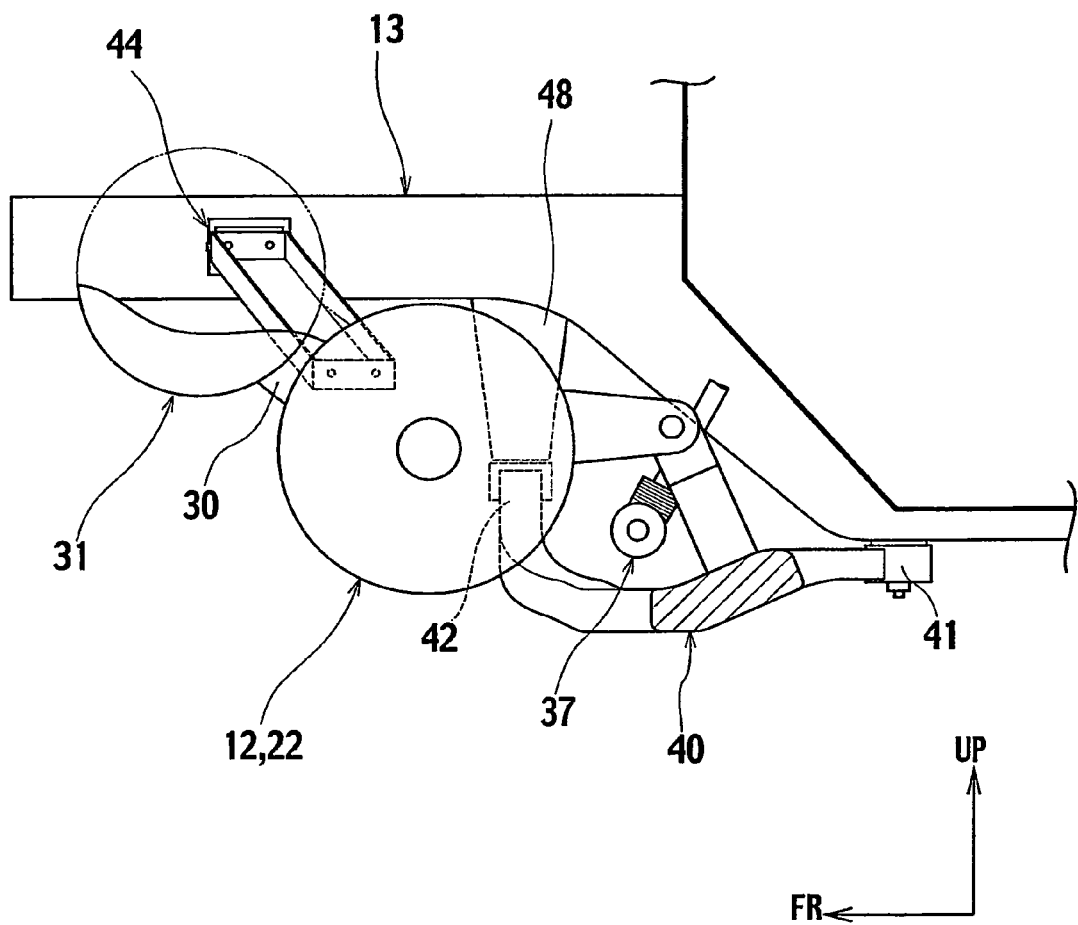
FIG. 9 is a cross-sectional view along the line IX-IX in FIG. 8.

To be more specific, a front motor mount main body 45 is fixed to an inner side of the side member 13 in the vehicle width direction. In addition, a substantially U-shaped front motor mount bracket 46 is rotatably supported on the front motor mount main body 45. The front motor mount bracket 46 is attached to a right side of the drive motor unit 12 by use of an arm 47 which is extended backward and obliquely downward from the bracket 46 and has a substantially U-shaped cross section. Note that, as shown in FIG. 9, the front motor mounts 43 and 44 are attached in positions above the rear motor mount 25.

Description will be given of transmission of a collision load inputted to a vehicle body including the attachment structure described above.

Figure 10:
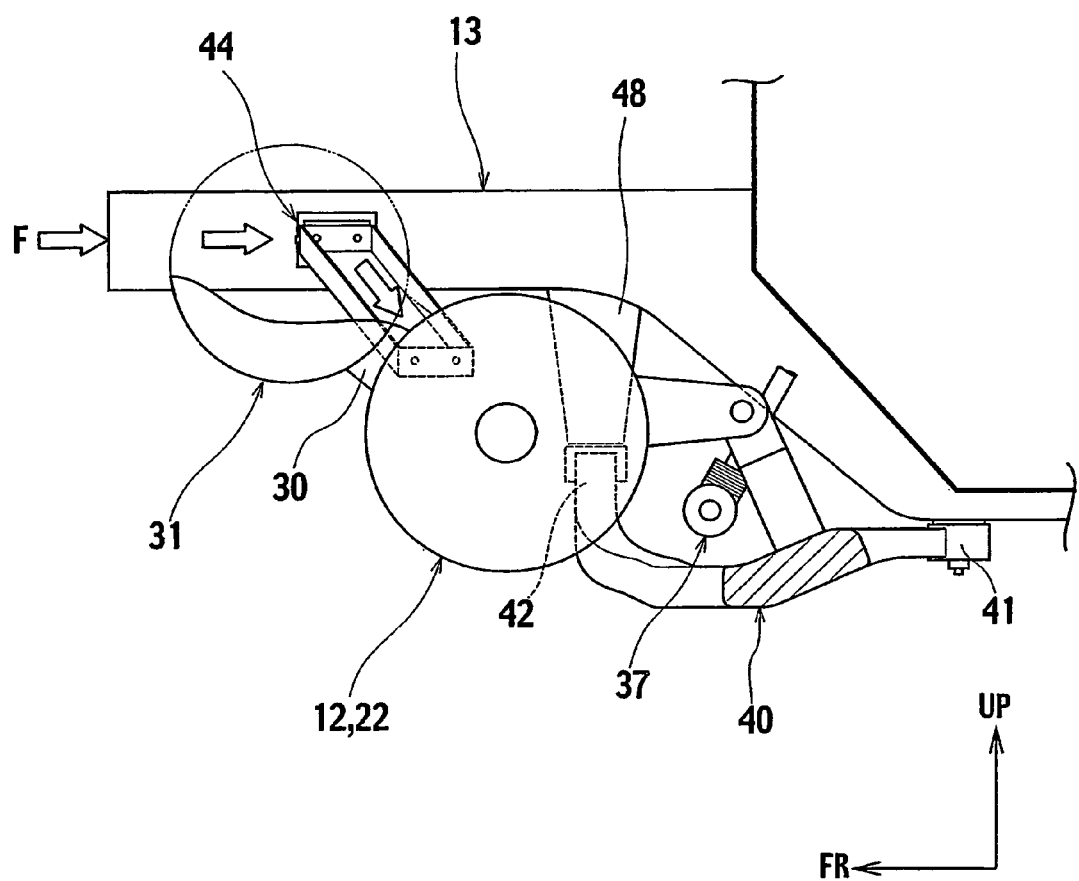
FIG. 10 is a side view showing transmission of a collision load inputted to the side member.

As shown in FIG. 10, when the vehicle encounters a frontal collision, a collision load F is inputted to front ends of the side members 13, and the collision load F is transmitted backward along the side members 13.

Next, the collision load F is transmitted to the drive motor unit 12 through the front motor mounts 43 and 44 which are extended backward and obliquely downward from the side members 13. Here, since the rear part of the drive motor unit 12 is attached to the suspension member 40 by use of the rear motor mount 25 and the stay 26, the front motor mounts 43 and 44 are deformed, and the drive motor unit 12 is moved downward.

Hereinafter, operational effects achieved according to this embodiment will be described.

Since the front motor mounts 43 and 44 are attached to the side members 13, even if the collision load F is not directly inputted to the air compressor 31 such as the case of a so-called offset collision where the collision load F is inputted from a left front end of the vehicle, for example, the collision load F inputted from the side members 13 is directly and surely inputted to the front motor mounts 43 and 44. Consequently, the front motor mounts 43 and 44 can be deformed.

Moreover, the front motor mounts 43 and 44 are disposed above the rear motor mount 25. Thus, as described above, particularly at the time of the offset collision or the like, the drive motor unit 12 and the air compressor 31 fixed to the drive motor unit 12 are moved downward and can be effectively prevented from being moved toward a passenger compartment of the vehicle.

Furthermore, the rear motor mount 25 is supported by the stay 26, and the rear motor mount 25 supports the drive motor unit 12 on one spot and the front motor mounts 43 and 44 support the drive motor unit 12 on two left and right spots. Thus, the strength of the rear motor mount 25 becomes lower than that of the front motor mounts 43 and 44. Consequently, the drive motor unit 12 can be effectively dropped downward.

The attachment structure for the drive motor according to the present invention has been described above by taking the embodiments as an example. However, it is needless to say that the present invention is not limited to the respective embodiments described above. Various embodiments can be adopted without departing from the scope of the present invention.

For example, the air compressor 31 does not have to be supported directly by the drive motor unit 12. In such a case, the air compressor 31 may be disposed in front of and obliquely above the drive motor unit 12 so as to overlap with the drive motor unit 12 in a vertical direction.

Moreover, in the embodiments described above, description was given by taking, for example, the air compressor 31 as the rigid robust member including the metal casing. Meanwhile, instead of the air compressor 31, a control unit case of a drive motor and the like can also be used. The rigid robust member including the metal casing, such as the air compressor 31 and the control unit case of the drive motor, enables the load at vehicle collision to surely act to push the drive motor downward.

INDUSTRIAL APPLICABILITY

In the attachment structure for the drive motor according to the present invention, the drive motor unit is attached to the suspension member by use of the front and rear motor mounts. Moreover, the rigid robust member is provided in front of and obliquely above the drive motor unit as well as above and in front of the front motor mount. According to the structure described above, when the vehicle encounters a frontal collision, the collision load is inputted to the rigid robust member before it is inputted to the drive motor unit and the front motor mount. Accordingly, the drive motor unit is rotated around the front motor mount and moved downward by the load. As described above, without adding a link member and the like, the collision load transmitted to the passenger space is significantly reduced, and backward movement of the dash panel is suppressed. Thus, the attachment structure of the present invention is industrially applicable.

The invention claimed is:

1. A drive motor mounting structure of an electric vehicle, comprising:

a drive motor unit attached to a vehicle body member in a front part of a vehicle, wherein a front part of the drive motor unit is attached to the vehicle body member by at least one front motor mount disposed in front of the drive motor unit, wherein a rear part of the drive motor unit is attached to the vehicle body member by use of a rear motor mount disposed above the at least one front motor mount, wherein the at least one front motor mount has a strength higher than that of the rear motor mount, wherein the at least one front motor mount rotatably supports the front part of the drive motor unit so as to allow the drive motor unit to rotate downward around the at least one front motor mount; and a rigid robust member configured to generate a force to rotate the drive motor unit downward around the at least one front motor mount, wherein the rigid robust member is disposed in front of and obliquely above the drive motor unit, and above and in front of the at least one front motor mount.

2. The drive motor mounting structure according to claim 1, wherein the rigid robust member comprises a casing made of metal.

3. The drive motor mounting structure according to claim 1, wherein the rigid robust member comprises an air compressor.

4. The drive motor mounting structure according to claim 1, wherein the rigid robust member is mounted onto the drive motor unit in a state of being vibration isolated.

5. The drive motor mounting structure according to claim 1, wherein the vehicle body member comprises a suspension member having a substantially square-frame-shape in plan view, wherein the rear part of the drive motor unit is attached to the vehicle body member by the rear motor mount, and the rear motor mount is attached to a stay extended upward from a rear part of the suspension member.

6. The drive motor mounting structure according to claim 5, wherein the at least one front motor mount comprises front motor mounts provided on left and right sides of a front part of the suspension member to support left and right ends of the front part of the drive motor unit, respectively, and the rear motor mount supports the rear part of the drive motor unit.

7. A drive motor mounting structure of an electric vehicle, comprising:
    a drive motor unit attached to a vehicle body member and a side member in a front part of a vehicle,
    wherein a front part of the drive motor unit is attached to the side member by at least one front motor mount,
    wherein a rear part of the drive motor unit is attached to the vehicle body member by a rear motor mount disposed below the front motor mount,
    wherein the at least one front motor mount has a strength higher than that of the rear motor mount,
    wherein the at least one front motor mount supports the front part of the drive motor unit so as to allow the drive motor unit to move downward relative to the at least one front motor mount, and
    a rigid robust member configured to generate a force to move the drive motor unit downward relative to the at least one front motor mount, wherein the rigid robust member is disposed in front of and obliquely above the drive motor unit, and above and in front of the at least one front motor mount.

8. The drive motor mounting structure according to claim 7, wherein the rigid robust member comprises a casing made of metal.

9. The drive motor mounting structure according to claim 7, wherein the rigid robust member comprises an air compressor.

10. The drive motor mounting structure according to claim 7, wherein the rigid robust member is mounted onto the drive motor unit in a state of being vibration isolated.

11. The drive motor mounting structure according to claim 7, wherein the vehicle body member comprises a suspension member having a substantially H shape in plan view, the rear part of the drive motor unit is attached to the vehicle body member by the rear motor mount, and the rear motor mount is attached to a stay extended upward from a rear part of the suspension member.

12. The drive motor mounting structure according to claim 11, wherein the at least one front motor mount comprises front motor mounts attached to side members disposed on left and right sides of the suspension member, respectively, wherein both of left and right ends of the front part of the drive motor unit are supported by the front motor mounts, and the rear part of the drive motor unit is supported by the rear motor mount.

* * * * *